(No Model.)

A. F. & W. MEISSELBACH.
FISHING REEL.

No. 553,069. Patented Jan. 14, 1896.

Attest:
William Batson.
William H. Connor.

Inventors.
August F. Meisselbach and
William Meisselbach, per
Henry J. Miller, Atty.

UNITED STATES PATENT OFFICE.

AUGUST F. MEISSELBACH AND WILLIAM MEISSELBACH, OF NEWARK, NEW JERSEY.

FISHING-REEL.

SPECIFICATION forming part of Letters Patent No. 553,069, dated January 14, 1896.

Application filed July 17, 1895. Serial No. 556,209. (No model.)

*To all whom it may concern:*

Be it known that we, AUGUST F. MEISSELBACH and WILLIAM MEISSELBACH, citizens of the United States, residing at Newark, in the county of Essex and State of New Jersey, have invented certain new and useful Improvements in Fishing-Reels, fully described and represented in the following specification and the accompanying drawings, forming a part of the same.

This invention consists in the specific improvements in fishing-reels set forth in the claims annexed hereto and illustrated in the accompanying drawings, in which—

Figure 1:
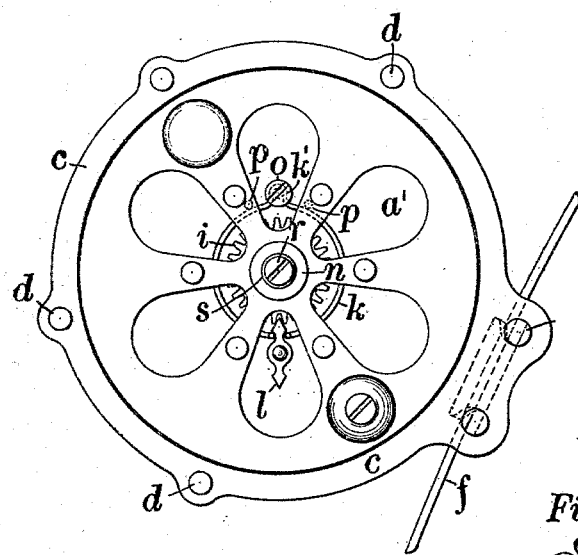
Figure 2:
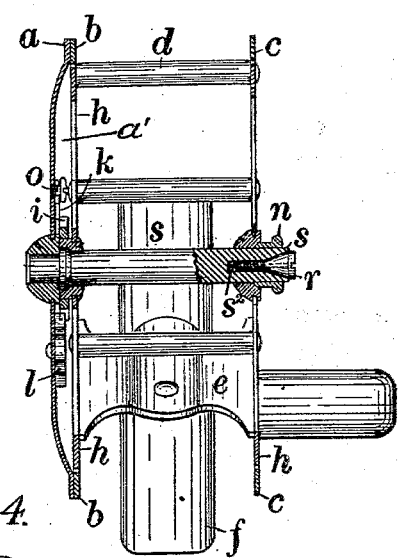
Figure 4:
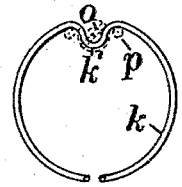

Figure 1 is a side elevation of a reel embodying the invention; Fig. 2, an edge view of the same partly in section at the center line where hatched, and Fig. 3 a perspective view of the same with the spool removed. Fig. 4 is a view of a slightly-modified form of click-spring from that shown in the preceding figures.

Figure 3:
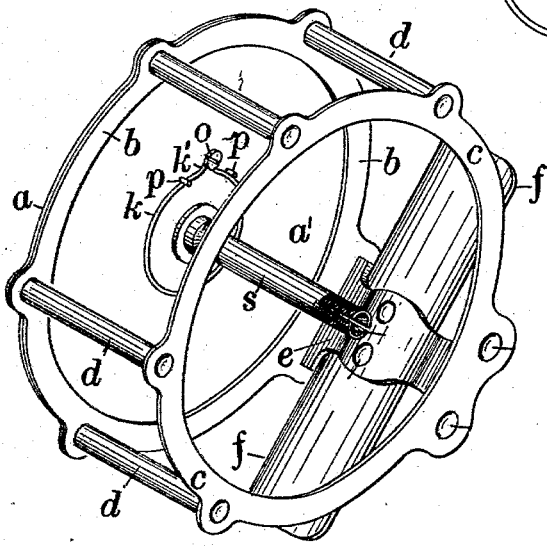

The cheek-plate $a$ consists of a sheet-metal disk dished to form a circular recess $a'$ in its inner face with an axial spindle $s$ projected from the bottom to sustain the spool which is provided with the flanges $h$. The spool is inclosed within a frame or cage comprising two sheet-metal rings $b$ and $c$ fitted internally to the peripheries of the reel-flanges and connected together at a distance apart equal to that of the reel-flanges by means of the peripheral studs $d$, which are also employed to secure the ring $b$ upon the inner face of the cheek-plate $a$ around its central recess. The inner end of the spool is provided in the usual manner with a click-wheel $i$ projected into the said recess $a'$ to engage the double-headed click $l$, which is retained in a position normally radial thereto by means of the wire spring $k$ encircling the said click-wheel with its opposed ends presented to the opposite sides of the said click. This click-spring is provided intermediate to its ends with an outwardly-projecting crook $k'$, as shown in Figs. 1 and 3, or with an inwardly-projecting crook, as shown in Fig. 4, upon each side of which is a straight pin $p$ projected from the bottom of the recess $a'$, and in contact with which the spring is held removably by means of the screw $o$ inserted in the said cheek-plate.

It may be observed that the pivotal pin for the click, whether threaded for application to the cheek-plate or not, is in all cases necessarily riveted therein to prevent its being jarred loose in the normal action of the click in engagement with its toothed wheel, and that it is therefore impracticable to secure the said click removably in place for convenient renewal. As such member of the device receives the hardest wear and its renewal can be attended only with considerable expense and with the inconvenience of its return to the manufacturer for such purpose, we have devised the double-headed click $l$, which may be readily reversed so as to double the life of such member by the mere removal of the spring $k$ to release the same from its normally radial position.

It will be further observed that the spring may be readily removed for repair or renewal by the user by merely removing the single screw $o$; and that by such means one or more extra springs originally furnished with a reel renders the latter adapted not only for the reversal of the double-headed click, as already described, but for the instant repair of the reel when the spring is broken or otherwise injured.

We are aware that it has been proposed heretofore to secure a click-spring removably in place by soldering to the same a block for attachment to the cheek-plate by two or more screws for preventing its lateral displacement relative to the click-wheel. We believe, however, that we are the first to provide straight pins adjacent to a single fastening-screw for positively retaining the spring in a fixed relation to the click, by which construction we are enabled to dispense with such intermediate fastening-block, but by applying the single screw to the naked spring simplify the construction and avoid the necessity of actually removing the screw for the release of the spring sufficient for the reversal of the click.

The reel-frame is shown provided with a bridge-piece $e$ carrying the transverse saddle or attachment-plate $f$; and the spindle is shown provided with a nut $n$ applied to its split threaded outer end in a screw-socket $s^2$, in which latter is inserted the expanding-screw $r$ for locking the said nut in place for retaining the spool upon its sustaining-spindle.

Having thus set forth the invention, what we claim herein, and desire to secure by Letters Patent, is—

1. In a fishing reel, the combination, with the reel frame formed with a suitable cheek plate carrying an axial reel spindle, a spool mounted upon the said spindle and provided with a click wheel adjacent to the said cheek plate, a click pivoted upon the inner face of the said cheek plate and adapted to engage the said click wheel, a click spring encircling the said click wheel and formed with opposed ends to bear upon opposite sides of the said click and having a crook intermediate to its ends, straight pins projected outwardly from the cheek plate at opposite sides of the crook but upon one side only of the spring, and a screw applied to the cheek plate within the said crook to retain the said spring in contact with said pins and secure the same removably upon the cheek plate, as and for the purpose set forth.

2. In a fishing reel, the combination, with the reel frame formed with a suitable cheek plate carrying an axial reel spindle, a spool mounted upon the said spindle and provided with a click wheel adjacent to the said cheek plate, a reversible double headed click pivoted upon the inner face of the said cheek plate and adapted to engage the said click wheel, a click spring encircling the said click wheel and formed with opposed ends to bear upon opposite sides of the said click and having a crook intermediate to its ends, straight pins projected outwardly from the cheek plate at opposite sides of the crook but upon one side only of the spring, and a screw applied to the cheek plate within the said crook to retain the said spring in contact with said pins and secure the same removably upon the cheek plate, as and for the purpose set forth.

In testimony whereof we have hereunto set our hands in the presence of two subscribing witnesses.

AUGUST F. MEISSELBACH.
  WILLIAM MEISSELBACH.

Witnesses:
 GEORGE FLOTTMANN,
 HENRY J. MILLER.